United States Patent [19]
Wirtz

[11] 3,992,098
[45] Nov. 16, 1976

[54] SYSTEM FOR DIGITALLY CONTROLLING EXPOSURE TIME OF CAMERA

[75] Inventor: John S. Wirtz, Henrietta, N.Y.
[73] Assignee: Itek Corporation, Lexington, Mass.
[22] Filed: July 2, 1975
[21] Appl. No.: 592,492

[52] U.S. Cl. ............................... 355/68; 354/23 D; 354/31; 354/50; 354/60 A
[51] Int. Cl.² ................. G03B 27/74; G03B 27/78
[58] Field of Search ............ 354/20, 22, 23 R, 23 D, 354/50, 60 R, 60 A, 31; 355/67, 68; 250/214 DC, 214 P; 356/202, 205, 218, 222

[56] References Cited
UNITED STATES PATENTS

| | | |
|---|---|---|
| 3,528,749 | 9/1970 | Bowker ............................. 356/202 |
| 3,542,470 | 11/1970 | Ost ................................... 355/68 |
| 3,663,110 | 5/1972 | Rising ........................... 250/214 DC |
| 3,879,135 | 4/1975 | Egli et al. ........................... 356/222 |

Primary Examiner—Russell E. Adams, Jr.
Attorney, Agent, or Firm—Homer O. Blair; Robert L. Nathans; Gerald H. Glanzman

[57] ABSTRACT

A system is disclosed for measuring the background density of an object to be photographed wherein a count is inserted into a counter proportional to the measured density. The intensity of illumination of the object is thereafter measured and the count within the counter is counted down at a rate proportional to the measured illumination intensity until the count reaches zero; the beginning of the exposure interval being defined by the start of the countdown step and the end of the interval being defined by the count in the counter reaching a predetermined value.

9 Claims, 1 Drawing Figure

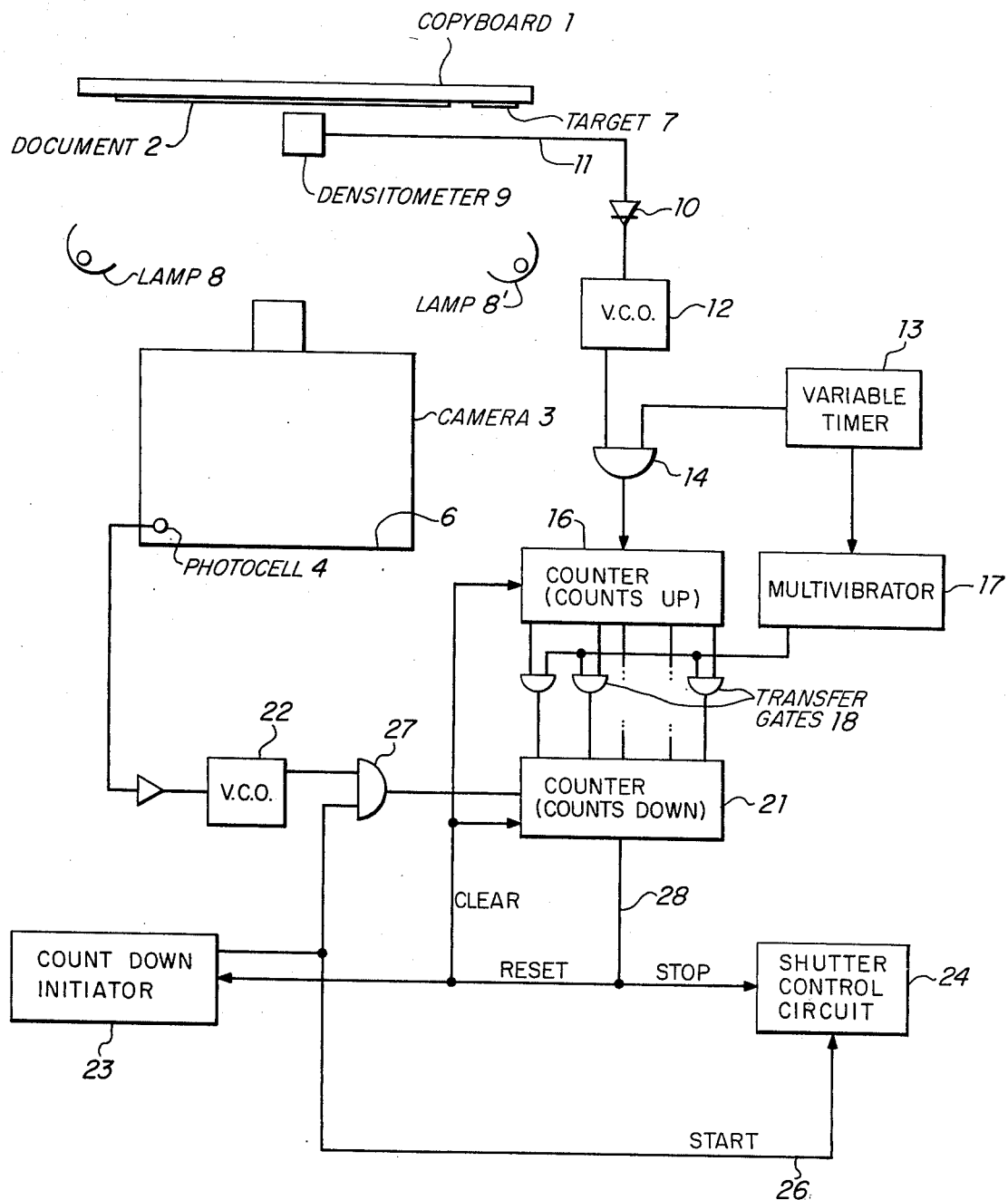

SYSTEM FOR DIGITALLY CONTROLLING EXPOSURE TIME OF CAMERA

BACKGROUND OF THE INVENTION

This invention relates to the field of exposure control systems.

Numerous systems are known for selectively controlling the exposure interval of a camera shutter. Most of these systems are essentially analog in nature wherein comparators compare the signal proportional to the illumination intensity with a changing analog reference signal often produced by an "RC" circuit. The beginning of the exposure interval is initiated by changing the charge in a capacitor and the end of the interval occurs when the above-mentioned comparison occurs. Since these systems are essentially analog in character, variations in the component parameters such as capacitance and resistance produce inaccuracies in the desired exposure intervals. Voltage fluctuations associated with the power supplies employed therein, and noise variations, and leaky capacitors also produce errors.

Accordingly, it is highly desirable to produce an inexpensive, stable, and accurate essentially digital shutter exposure control system.

SUMMARY OF THE INVENTION

In accordance with a preferred embodiment, a system is provided for initially producing an analog signal proportional to the measured density of an object to be photographed, which in turn causes a count to be inserted into a counter proportional to the measured density; the greater the density, the longer the required exposure time and the greater the count inserted into the counter. The intensity of illumination at a target area associated with the object is measured, and a pulse train is generated for counting down the count within the counter during the exposure interval at a rate proportional to the measured illumination intensity. The greater the density, the higher the count inserted into the counter, and the greater the illumination intensity, the faster the count is counted down so that the exposure interval is defined by these two factors.

Other objects, features, and advantages of the present invention will become apparent from the perusal of the following description taken in conjunction with the sole FIGURE illustrating a preferred embodiment.

DETAILED DESCRIPTION

In the figure, copyboard 1 having an object taking the form of a document 2 thereon (e.g., a wash/drawing) is viewed by camera 3 having a transducer such as a photocell 4 positioned within image plane 6 at a corner portion thereof. A light scattering target 7, such as white paper, is positioned at the copyboard portion imaged at transducer 4 so that photocell 4 produces a signal proportional to the illumination intensity at target 7. The entire copyboard 1 including target 7 is illuminated by lamps 8 and 8'.

Document 2 has background areas of various densities. In accordance with the system of the preferred embodiment, the darkest background area is examined by positioning densitometer 9 adjacent such area. The densitometer 9, which may be of a conventional type, produces an analog signal on conductor 11 inversely proportional to the density. Inverter amplifier 10 is then used to produce a signal directly proportional to the density. The inverter may be omitted if a densitometer is employed which produces a voltage directly proportional to density.

The greater the measured density of the above-mentioned background area, the longer the desired exposure interval. On the other hand, the greater the intensity of illumination measured by photocell 4, the shorter the desired exposure interval. In accordance with this objective, a voltage controlled oscillator 12 produces a first pulse train having a frequency directly proportional to the measured density. A timer 13 enables AND gate 14 during a predetermined interval to cause the first pulse train to produce a count within counter 16 directly proportional to the measured density. At the end of the interval defined by timer 13, a multivibrator 17 is activated by the trailing edge of the timing pulse to transfer the count into counter 21 via transfer gates 18. Thus, the count to be counted down within counter 21 is greater where the background density is greater, thus tending to increase the exposure interval as the count within counter 21 is counted down to a predetermined value, e.g., 0, to terminate the exposure interval. Densitometer 9 is thereafter removed and the signal produced by photocell 4 controls the frequency of voltage controlled oscillator 22 to produce a second pulse train having a frequency directly proportional to the intensity of light reflected from target 7 and viewed by photocell 4. The countdown initiator circuit 23 produces a "start" signal which is applied to shutter control circuit 24 over conductor 26, which control circuit could take the form of a solid-state latching relay for controlling a shutter solenoid. This signal is also applied to AND gate 27 which permits the second pulse train produced by oscillator 22 to be applied to counter 21 to commence the "countdown" process. When the count in counter 21 reaches zero, a "stop" signal is produced which is applied to shutter control circuit 24 over conductor 28 thereby to unlatch the relay to define the end of the exposure interval. The stop signal also resets the initiator 23 (which could comprise a flip flop) and clears all counters including counter 16.

The above-mentioned predetermined timing interval defined by the pulse produced by timer 13 may be varied depending upon film speed. For example, where higher speed films are employed, this timing interval will be shorter in order to cause the countdown interval to in turn be shorter.

In summary, in accordance with a preferred embodiment of the invention, a count is produced in a counter directly proportional to the background density of an illuminated object or which is inversely proportional to the reflected illumination intensity at such background areas. The count is thereafter counted down during the exposure interval at a rate directly proportional to the measured illumination intensity until the count is reduced to 0 wherein the exposure interval is terminated.

Obviously, numerous variations may be employed in carrying out the present invention. For example, the end of the exposure interval may be defined by any predetermined count within the counter rather than 0 depending upon the setting of the digital comparator within the counter.

Densitometer 9 may be sold separately from the rest of the system making up the present invention. Also, a count may be inserted manually into counter 16 by an operator measuring density rather than employing the oscillator 12, if desired. Additionally, the densitometer could be used to measure the target illumination intensity besides background density. For certain applications the term "density" is intended to cover darkness of selected portions or the entire portion of the scene viewed by the camera rather than density in its stricter sense.

While a preferred embodiment of the invention has been described, the teachings of this invention will readily suggest many other embodiments to those skilled in the art.

What is claimed is:

1. A system for actuating a camera shutter during a controllable exposure interval, wherein said camera photographs an object having a given background density comprising:
   a. a densitometer for measuring said background density before the commencement of said exposure interval;
   b. counter means for storing a count therein proportional to said background density;
   c. a first counter control means for inserting a count into said counter means proportional to said background density as measured by said densitometer;
   d. object illumination intensity measuring means;
   e. second counter control means for changing the count within said counter means at a rate proportional to the illumination intensity measured by said illumination intensity measuring means; and
   f. shutter control means for opening said shutter at the beginning of said exposure period, and for closing said shutter when the changing count with said counter means reaches a predetermined value.

2. The system of claim 1 wherein said first counter control means includes a first pulse generator for producing a first pulse train having a frequency which is proportional to the object density measured by said densitometer.

3. The system as set forth in claim 2 including gating means for inserting said first pulse train into said counter means during a predetermined time interval to cause a count to be introduced into said counter means which is proportional to the background density of said object being photographed.

4. A system of claim 1 wherein said illumination intensity measuring means includes a transducer for producing a signal proportional to said illumination intensity; and said second counter control means includes a second pulse train generator coupled to said transducer for producing a second pulse train having a frequency proportional to said illumination intensity for changing the count in said counter.

5. A system of claim 3 wherein said illumination intensity measuring means includes a transducer for producing a signal proportional to said illumination intensity; and said second counter control means includes a second pulse train generator coupled to said transducer for producing a second pulse train having a frequency proportional to said illumination intensity for changing the count in said counter.

6. The system as set forth in claim 3 further including timing means for varying said predetermined time interval by varying the gating time of said gating means in accordance with variations in film speed.

7. A method of controlling the exposure interval of a camera comprising the steps of:
   a. viewing the density of an object to be photographed and producing a first signal proportional to said density;
   b. inserting a count into a counter proportional to said first signal;
   c. producing a second signal proportional to the intensity of illumination of said object;
   d. opening said shutter;
   e. changing the count within said counter at a rate proportional to said second signal until the count within said counter reaches a predetermined value; and
   f. closing said shutter when said count reaches said predetermined value.

8. A shutter control system associated with a camera for opening a shutter during a controllable exposure interval, which camera is orientated to photograph an illuminated copyboard having an object thereon having a given background density comprising:
   a. a densitometer for measuring said background density before the commencement of said exposure interval and for producing an analog signal directly proportional to said density;
   b. digital counter means for storing a count therein proportional to said background density;
   c. a first voltage controlled pulse generator coupled between said densitometer and said digital counter means for producing a first pulse train having a frequency directly proportional to the density measured by said densitometer;
   d. gating means coupled between said first voltage controlled pulse generator and said digital counter means for gating said first pulse train to an input circuit of said digital counter means during a predetermined time interval for changing the count in said digital counter means by an amount directly proportional to the density measured by said densitometer;
   e. a transducer for viewing an illuminated target portion of said copyboard and for producing an analog signal proportional to the illumination intensity thereof;
   f. a second voltage controlled pulse generator coupled to said transducer for producing a second pulse train having a frequency directly proportional to the illuminated intensity of said target area; and
   g. shutter control means for initiating said exposure interval by opening said shutter and for gating said second pulse train produced by said second voltage controlled pulse generator to said digital counter means for causing the count therein to be changed until said count reaches a predetermined value wherein said shutter is closed.

9. The shutter control system of claim 8 further including timing means for varying said predetermined time interval by varying the gating time of said first gating means in accordance with variations in film speed.

* * * * *